(12) United States Patent
Gao et al.

(10) Patent No.: US 10,520,743 B2
(45) Date of Patent: Dec. 31, 2019

(54) BACKLIGHT MODULE, DISPLAY DEVICE AND METHOD FOR DRIVING THE SAME

(71) Applicants: BOE Technology Group Co., Ltd., Beijing (CN); Beijing BOE Optoelectronics Technology Co., Ltd., Beijing (CN)

(72) Inventors: Jian Gao, Beijing (CN); Xue Dong, Beijing (CN); Xiaochuan Chen, Beijing (CN); Wenqing Zhao, Beijing (CN); Pengcheng Lu, Beijing (CN); Ming Yang, Beijing (CN); Qian Wang, Beijing (CN); Xiaochen Niu, Beijing (CN); Rui Xu, Beijing (CN); Lei Wang, Beijing (CN); Pengpeng Wang, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 67 days.

(21) Appl. No.: 15/509,358

(22) PCT Filed: Jul. 29, 2016

(86) PCT No.: PCT/CN2016/092349
§ 371 (c)(1),
(2) Date: Mar. 7, 2017

(87) PCT Pub. No.: WO2017/117988
PCT Pub. Date: Jul. 13, 2017

(65) Prior Publication Data
US 2018/0143447 A1    May 24, 2018

(30) Foreign Application Priority Data
Jan. 8, 2016  (CN) .......................... 2016 1 0012115

(51) Int. Cl.
*G02B 27/22*  (2018.01)
*F21V 8/00*  (2006.01)
(Continued)

(52) U.S. Cl.
CPC ........... *G02B 27/22* (2013.01); *G02B 6/0016* (2013.01); *G02B 6/0053* (2013.01);
(Continued)

(58) Field of Classification Search
CPC .. G02B 6/0016; G02B 27/22; G02B 27/2214; G02B 6/0053; G02F 1/133528;
(Continued)

(56) References Cited

U.S. PATENT DOCUMENTS 6,449,096 B1 * 9/2002 Fabiny ................. G02B 5/1809
359/571
6,879,355 B1   4/2005 Kim
(Continued)

FOREIGN PATENT DOCUMENTS

CN   101261389 A   9/2008
CN   101576215 A   11/2009
(Continued)

OTHER PUBLICATIONS

Oct. 31, 2016—(WO) International Search Report and Written Opinion Appn PCT/CN2016/092349 with English Tran.
(Continued)

*Primary Examiner* — Hoan C Nguyen
(74) *Attorney, Agent, or Firm* — Banner & Witcoff, Ltd.

(57) ABSTRACT

A backlight module, a display device and a method for driving the same are disclosed, such that brightness of display device can be increased when rendering 3D display. The backlight module includes a light guide plate, a light-splitting structure and an edge light source, wherein the light-splitting structure includes a plurality of strip-shaped
(Continued)

first light-splitting units and a plurality of strip-shaped second light-splitting units, the first light-splitting unit and second light-splitting unit are alternately disposed on the light output surface of the light guide plate, each of first light-splitting unit and second light-splitting unit comprises at least one grating strip, the first light-splitting unit is configured for directing light to output towards a first position external to the backlight module, and the second light-splitting unit is configured for directing light to emit towards a second position external to the backlight module. The backlight module is applied into the display device, such that the display device achieves 3D display function.

19 Claims, 5 Drawing Sheets

(51) Int. Cl.
  *G02F 1/1335* (2006.01)
  *G09G 3/36* (2006.01)
  *G09G 3/00* (2006.01)
  *G09G 3/34* (2006.01)

(52) U.S. Cl.
  CPC ... *G02B 27/2214* (2013.01); *G02F 1/133528* (2013.01); *G02F 1/133602* (2013.01); *G09G 3/003* (2013.01); *G09G 3/3406* (2013.01); *G09G 3/36* (2013.01); *G09G 2310/0264* (2013.01)

(58) Field of Classification Search
  CPC ... G02F 1/133602; G02F 1/1335; G09G 3/36; G09G 2310/0264; G09G 3/3406; G09G 3/003
  See application file for complete search history.

(56) References Cited

U.S. PATENT DOCUMENTS

| | | | | |
|---|---|---|---|---|
| 9,971,083 | B2* | 5/2018 | Jung | G02B 6/0026 |
| 2003/0214497 | A1* | 11/2003 | Morishima | G02B 27/2214 345/204 |
| 2004/0246743 | A1* | 12/2004 | Lee | G02B 6/0036 362/561 |
| 2006/0007700 | A1* | 1/2006 | Hsu | G02B 6/0056 362/600 |
| 2006/0245209 | A1* | 11/2006 | Jeong | G02B 6/0068 362/612 |
| 2007/0004195 | A1* | 1/2007 | Park | G02F 1/133604 438/626 |
| 2008/0278805 | A1* | 11/2008 | Schwerdtner | H04N 13/368 359/463 |
| 2010/0214514 | A1 | 8/2010 | Lin et al. | |
| 2011/0043715 | A1* | 2/2011 | Ohyama | G02B 27/2214 349/15 |
| 2011/0188106 | A1* | 8/2011 | Bae | G02B 26/08 359/226.3 |
| 2011/0221998 | A1* | 9/2011 | Adachi | G02B 6/0036 349/62 |
| 2014/0300961 | A1* | 10/2014 | Kim | G02B 27/2214 359/463 |
| 2015/0271482 | A1* | 9/2015 | Chen | G02F 1/134309 349/65 |
| 2015/0346498 | A1* | 12/2015 | Zhong | G02B 27/22 349/61 |

FOREIGN PATENT DOCUMENTS

| | | |
|---|---|---|
| CN | 103454807 A | 12/2013 |
| CN | 203688918 U | 7/2014 |
| CN | 1044060115 A | 3/2015 |
| CN | 105572889 A | 5/2016 |
| CN | 105676474 A | 6/2016 |
| JP | 2000029026 A | 1/2000 |
| JP | 2007232809 A * | 9/2007 |

OTHER PUBLICATIONS

Jun. 4, 2019—(CN) Second Office Action Appn 201610012115.1 with English Translation.

* cited by examiner

BACKLIGHT MODULE, DISPLAY DEVICE AND METHOD FOR DRIVING THE SAME

CROSS REFERENCE OF RELATED APPLICATION

The application is a U.S. National Phase Entry of International Application No. PCT/CN2016/092349 filed on Jul. 29, 2016, designating the United States of America and claiming priority to Chinese Patent Application No. 201610012115.1, filed on Jan. 8, 2016. The present application claims priority to and the benefit of the above-identified applications and the above-identified applications are incorporated by reference herein in their entirety.

FIELD OF THE ART

Embodiments of the disclosure relate to a backlight module, a display device and a method for driving the same.

BACKGROUND 3D display technologies experienced rapid development over the past years. 3D display technologies may be categorized into glasses 3D and glasses-free 3D technologies. In comparison with glasses 3D display technologies, glasses-free 3D display technologies attract more attention as no glasses are needed.

Glasses-free 3D display technologies are classified into three types, namely, directional backlight, parallax barrier, and lenticular lens array.

SUMMARY

The disclosure aims to provide a backlight module, a display device and a method for driving the same, such that brightness of display devices can be increased when rendering 3D display.

A first aspect of the disclosure provides a backlight module, comprising a light guide plate, a light-splitting structure and an edge light source, wherein the light-splitting structure is disposed on a light output surface of the light guide plate, the edge light source is disposed on a side surface of the light guide plate, the light-splitting structure comprises a plurality of strip-shaped first light-splitting units and a plurality of strip-shaped second light-splitting units, the first light-splitting units and second light-splitting units are alternately disposed on the light output surface of the light guide plate, each of first light-splitting unit and second light-splitting unit comprises at least one grating strip, the first light-splitting unit is configured for directing light to output towards a first position external to the backlight module, and the second light-splitting unit is configured for directing light to emit towards a second position external to the backlight module.

Based on the backlight module, a second aspect of the disclosure provides display device comprising the backlight module in the first aspect and a display panel superimposed on the backlight module, wherein the display panel comprises a plurality of pixels arranged as an array, a width of each of the first light-splitting unit and the second light-splitting unit of the backlight module is equal to that of the pixels of the display panel, and the first light-splitting unit and the second light-splitting unit are in one-to-one correspondence with pixel columns.

Based on the display device, a third aspect of the disclosure provides method for driving a display device in the second aspect, among pixels of the display device, pixels corresponding to the first light-splitting units of the display device are first pixels, and pixels corresponding to the second light-splitting units of the display device are second pixels; the method comprises: driving the display device to render 3D display, wherein image signals for the left eye are transmitted to the first pixels, and image signals for the right eye are transmitted to the second pixels at the same time.

In embodiments of the disclosure, a light-splitting structure including grating strips is disposed in the backlight module, such that the separation of light is achieved by the diffraction and interference of the light through grating strips, and the display panel achieves 3D display. Since the separation of light is achieved by using the light-splitting structure and proper light is provided for the display panel to render 3D display, most of the light provided by the backlight module can be used, which avoid the problem of low light usage caused by the parallax barrier and increases the brightness of 3D images.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

NUMERAL REFERENCES 100 backlight module; 1 light guide plate;
2 light-splitting structure; 10 display device;
21 first light-splitting unit; 22 second light-splitting unit;
31 reflective film; a grating strip;
a1 groove surface; a2 grating surface;
a' first grating strip; a" second grating strip;
3 edge light source; 4 underlying light source;
Q target position; Q1 first threshold position;
Q2 second threshold position; 5 adhesive;
200 display panel; 6 cavity;
7 lower polarizer; 8 liquid crystal cell;
81 first substrate; 82 liquid crystal layer;
83 second substrate; 9 upper polarizer;
L first pixel; R second pixel.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Parallax barrier 3D display technology adds a parallax barrier in front of a display module. The parallax barrier has alternately arranged light transmissive strips and light-blocking strips and can split light beams output from the display module, such that a part of the light beams arrives at the left eye of a viewer and the other part of the light beams arrives at the right eye of the viewer. Images viewed by the left and right eyes of the viewer are combined by the brain to produce a 3D effect.

However, the parallax barrier splits light by blocking light, which makes light usage of a parallax barrier 3D display device relatively low, normally lower than 50%, which makes brightness of images displayed by the parallax barrier 3D display device low.

Embodiment 1

Figure 1:
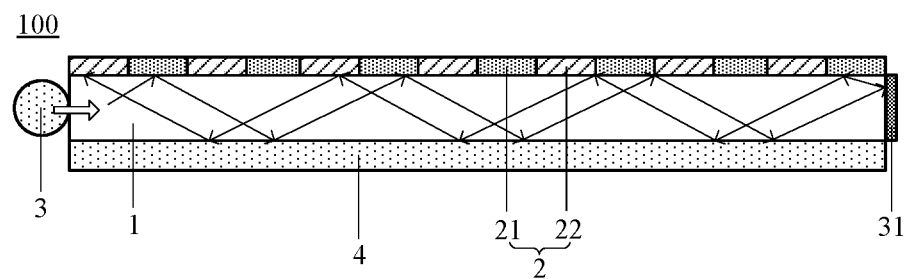
FIG. 1 is a side view of a backlight module in accordance with an embodiment of the disclosure.
Figure 2:
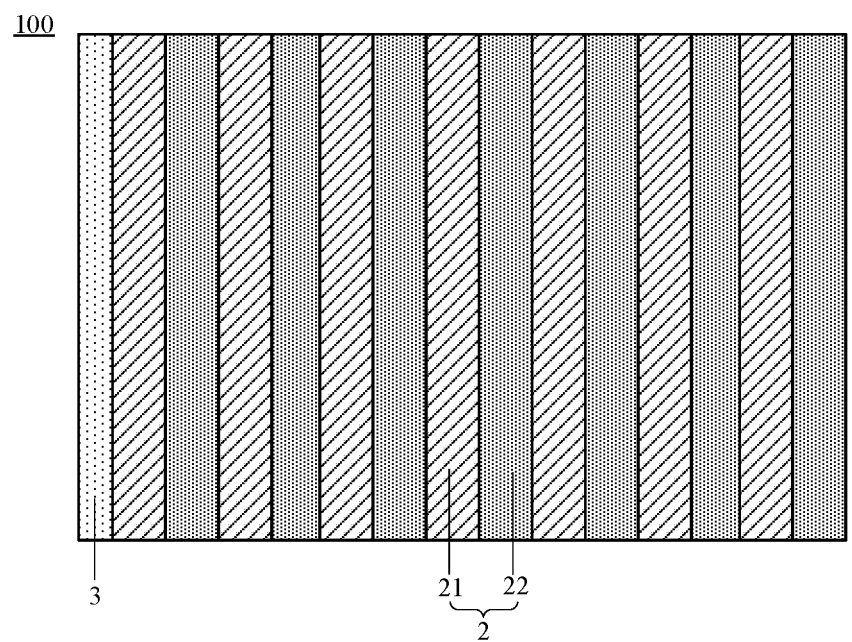
FIG. 2 is a top view of the backlight module in accordance with an embodiment of the disclosure.

The embodiment provides a backlight module. As illustrated in FIGS. 1 and 2, the backlight module 100 comprises a light guide plate (LGP) 1, a light-splitting structure 2 and an edge light source 3. The light-splitting structure 2 is disposed on a light output surface of the light guide plate 1, and the edge light source 3 is disposed on a side surface of the LGP 1.

As an example, in the LGP 1, the side surface having the edge light source 3 is referred to as a first side surface, and a side surface opposite to the first side surface is a second side surface. When the edge light source 3 is switched on, light emitted by the edge light source 3 enters the LGP 1 from the first side surface. The light is continuously reflected in the LGP 1 and thereby transmitted from the first side surface to the second side surface.

As an example, the light-splitting structure 2 comprises a plurality of strip-shaped light-splitting units 21 and 22. Each light-splitting unit comprises at least one grating strip, and an extension direction of the grating strip is the same as that of the strip-shaped light-splitting units 21 and 22. The grating strip makes light to emit along a specific direction. When light from the edge light source 3 are reflected and propagating in the LGP 1 and the light strikes the grating strip at a certain incident angle, the grating strip can cause the light to have grating diffraction and interference, and to emit along a specific direction. "The specific direction" is determined according to the needed light output direction (for example, determined by a target position for receiving the output light). By designing specific configurations of the grating strip, the output light along "a specific direction" may be obtained.

As an example, based on the above structure of the light-splitting units, the light splitting structure 2 comprises first light splitting units 21 and second light-splitting units 22. That is, the light splitting units in the light-splitting structure 2 are for example the first light-splitting units 21 and the second light-splitting units 22. The first light-splitting units 21 and second light-splitting units 22 are alternately disposed on the light output surface of the LGP 1. By respectively designing configurations of the grating strips of the first light-splitting units 21 and the grating strips of the second light-splitting units 22, the first light-splitting units 21 are configured for directing light to output towards a first position external to the backlight module, and the second light-splitting units 22 are configured for directing light to output towards a second position external to the backlight module.

As an example, when the backlight module 100 is applied to a 3D display device, "the first position external to the backlight module" may be the left eye of a viewer. Accordingly, "the second position external to the backlight module" may be the right eye of the viewer. That is to say, light outputs towards the left eye of the viewer under the action of the first light-splitting units 21, and eventually enters the left eye of the viewer; light outputs towards the right eye of the viewer under the action of the second light-splitting units 22, and eventually enters the right eye of the viewer, thereby providing suitable light for the 3D display device to render 3D display. It is noted that "the first position external to the backlight module" and "the second position external to the backlight module" are not fixed positions; instead, they may change according to the position of the 3D display device.

As an example, by having the light-splitting structure 2, the backlight module 100 of the embodiment can provide suitable light for the 3D display device to render 3D display. As a result, the display device can realize a 3D display function by having the backlight module 100 of the embodiment configured therein. This is different from a parallax barrier 3D display device, which not only needs a backlight module but also need a parallax barrier to realize the 3D display function. As a result, the backlight module 100 of the embodiment makes it possible for the 3D display device to display 3D images without having a parallax barrier. On one hand, it overcomes the problem of low light usage caused by the parallax barrier and increases the brightness of 3D images. On the other hand, it reduces the cost of 3D display devices, reducing the thickness of the 3D display devices as well as volume and weight of the 3D display devices.

Moreover, for directional backlight 3D display devices, time division multiplexing of light source is needed during 3D display, which means complicated circuit structure and control program are needed to realize time division multiplex, making technical difficulty of the directional backlight 3D display devices high. In contrast, the backlight module 100 of the embodiment can provide suitable light for the display device to render 3D display by using the light-splitting structure 2, which is a simple technology that can be realized easily.

As an example, the backlight module 100 not only can provide a display device with proper light for 3D display, but also can provide light when the display device is used for 2D display. As a result, the display device may have a function of switching between 3D display and 2D display.

For a lenticular lens array 3D display device, its 3D display function is realized by disposing optical lens before the display panel. However, when such a display device is used for 2D display, the optical lens of the display panel will cause some optical aberration, which will cause 2D images of the display device to be displayed poorly. In comparison with the lenticular lens array 3D display device, the backlight module of the embodiment provides proper light for the display device to render 3D display by configuring the light-splitting structure 2 and the edge light source 3. Moreover, the backlight module 100 can also provide light for 2D display by the display device. That is to say, by way of improvement only to the backlight module 100, the display device may have the function of switching between 3D display and 2D display, without the need for optical lens. It thereby not only avoids the optical aberration caused for 2D display images, but also improves the 2D display effect of the 3D/2D display device.

In an example illustrated in FIG. 1, to improve the 2D display quality of the display device, an underlying light source 4 may be disposed on a surface opposite to the light output surface of the light guide plate 1 of the backlight module 100. The underlying light source 4 is for example a surface light source. When 2D display is needed, the edge light source 3 is switched off and the underlying light source 4 is switched on. Most of light emitted by the underlying light source 4 will enter the LGP 1 vertically; therefore lots of light will exit from the grating strips of the light-splitting structure 2, thereby increasing image brightness when the 3D/2D display device is used for 2D display.

As an example, the edge light source 3 and underlying light source 4 may be switched on at the same time, which will further increase image brightness when the 3D/2D display device is used for 2D display.

As an example, based on the above description, the side surface of the LGP 1 having the edge light source 3 is the first side surface, the extension direction of the light-splitting units 21 and 22 (e.g., a direction perpendicular to the paper of FIG. 1) for example may be parallel to a long side of the first side surface, such that most light enters the LGP 1 along a direction perpendicular to or substantially perpendicular to the extension direction of the light-splitting units 21 and 22 and gets reflected in the LGP 1 and then strikes the light-splitting units 21 and 22 at a specific angle. For example, the edge light source 3 may be a bar-shaped light source, the extension direction of bar-shaped light source is parallel to a long side of the first side surface, such that light may evenly enter the whole area of the first side surface of LGP 1.

Figure 3:
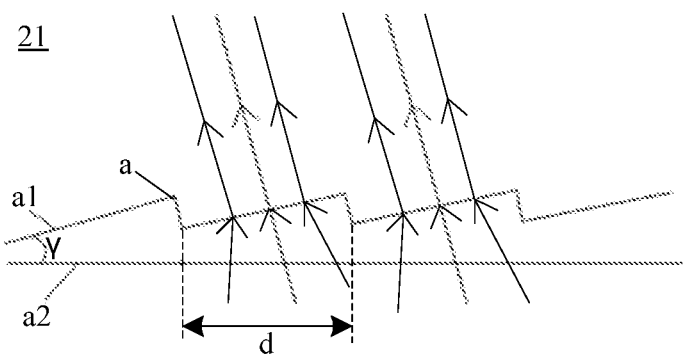
FIG. 3 is a side view of a first light-splitting unit in the backlight module in accordance with an embodiment of the disclosure.
Figure 4:
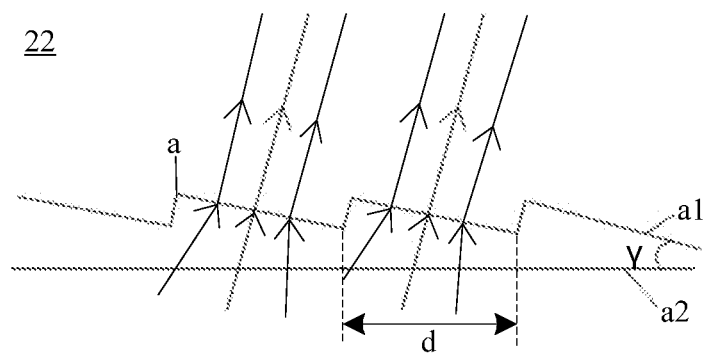
FIG. 4 is a side view of a second light-splitting unit in the backlight module in accordance with an embodiment of the disclosure.

In an example as illustrated in FIGS. 3 and 4, the grating strip a of the light-splitting unit is for example a blazed grating, which has the following structure: the grating strip a comprises a grating surface a2 and a groove surface a1, the grating surface a2 is parallel to the light output surface of the LGP 1, the groove surface a1 is tilted relative to the grating surface a2, therefore an inclination angle is formed between the grating surface a2 and the groove surface a1 and referred to as a blazed angle. In the embodiment, γ is used to represent the blazed angle of the grating strip a.

As an example, when light output from the light output surface of the LGP 1 incident on the groove surface a1 of the grating strip a at a certain incident angle, diffraction and interference will occur. A +1$^{st}$ interference main maximum is present in a direction perpendicular to the groove surface a1, and the +1$^{st}$ interference main maximum overlaps with diffraction central maximum of the groove surface a1. In the meantime, almost all positions of minimum of the groove surface a1 overlap with other orders of maximum, such that only the +1$^{st}$ spectrum blazes and achieves maximum light intensity. That is to say, the grating strip a as a blazing grating allows light of a specific wavelength to emit at a specific direction (i.e., at the direction perpendicular to the groove surface a1 of the grating strip a) with blazing and increased intensity.

As an example, for the grating strip a functioning as the blazed grating, the light output from the grating strip a is perpendicular to the groove surface a1 of the grating strip a, the grating surface a2 of the grating strip a is parallel to the light output surface of the LGP 1, therefore an inclination angle between the output light and a vertical line of the light output surface of the LGP 1 is equal to the blazed angle γ of the grating strip a. It is thus seen that the "specific direction" is determined according to the needed output direction, and the light outputting along the "specific direction" is achieved by designing the blazed angle γ of the grating strip.

As an example, for the grating strip a functioning as the blazed grating, the blazed angle γ, a width d of the grating strip a and the wavelength λ of output light passing the grating strip a (i.e., the specific wavelength) satisfy the equation 2d sin γ=λ. Therefore, the actual "specific wavelength" is determined according to the needed light wavelength, and output light having the "specific wavelength" is achieved by designing the blazed angle γ and width d of the grating strip a.

Figure 5:
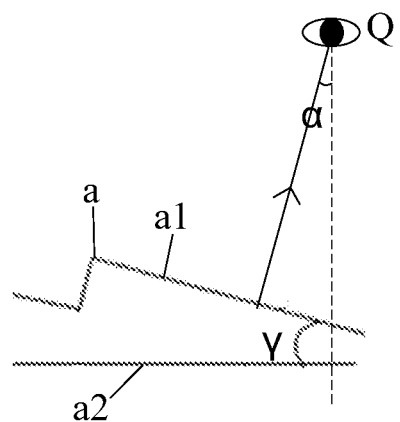
FIG. 5 illustrates a first exemplary position relationship between a target position and a grating strip.

As an example, based on the above analysis, for the grating strip a as the blazed grating, the inclination angle between the output light and the vertical line of the light output surface of the LGP 1 is equal to the blazed angle γ of the grating strip a. As illustrated in FIG. 5, a vertical line from a target position Q external to the backlight module to the groove surface of the grating strip a having the blazed angle γ is parallel to or overlaps with the output light; and a vertical line from the target position Q to the backlight module 100 overlaps or is parallel to the vertical line of the light output surface of the LGP 1. As a result, the blazed angle γ of the grating strip a is equal to an inclination angle α between the vertical line from the target position Q to the groove surface of the grating strip a having the blazed angle γ and the vertical line from the target position Q to the backlight module 100. As light output from the grating strip a is supposed to arrive at the target position, in case that the external target position is fixed, directions of light output from respective grating strips a of the backlight module 100 are determined, thereby determining an actual value of the blazed angle γ of the respective grating strips. After determining the blazed angle γ, a width value d of the respective grating strips a is determined according to the equation $$d = \frac{\lambda}{2\sin\gamma}$$

and based on the needed wavelength of the light (that is, the wavelength of light eventually output from the groove surface a1 of the grating strip a). It is noted the "target position external to the backlight module" is the "first position external to the backlight module" or the "second position external to the backlight module". When the backlight module 100 is used in a 3D display device, the "target position external to the backlight module" is the left or right eye of a viewer.

As an example, within one light-splitting unit of the light-splitting structure 2, as the light output from the respective grating strips a faces to the same target position, i.e., to the left or right eye of the viewer, groove surfaces a1 of the respective grating strips a are tilted in the same direction. It is noted that "tilted in the same direction" means the groove surfaces a1 of the respective grating strips a in the same light-splitting unit are parallel to each other, approximately or almost parallel to each other. For example, as illustrated in FIG. 3, in the first light-splitting unit 21, all groove surfaces a1 of the respective grating strips a is tilted rightward. In another example which is illustrated in FIG. 4, in the second light-splitting unit 22, all groove surfaces a1 of the respective grating strips a is tilted leftward.

As an example, for a first light-splitting unit 21 and a second light-splitting unit 22 neighboring each other in the light-splitting structure 1, light output from them faces to different target positions. The target position faced by light output from the first light-splitting unit 21 is the left eye of the viewer, and the target position faced by light output from the second light-splitting unit 22 is the right eye of the viewer. It is thus seen that light output from the first light-splitting unit 21 and the second light-splitting unit 22 neighboring each other should be separated from each other. Therefore, the groove surfaces a1 of the grating strips a in the first light-splitting unit 21 and the second light-splitting unit 22 neighboring each other are tilted toward different directions. For example, tilt direction of the groove surfaces a1 of the grating strips a in the first light-splitting unit 21 and the second light-splitting unit 22 neighboring each other is symmetrical or substantially symmetrical to the vertical line of the light output surface of the LGP 1. For example, when the first light-splitting unit 21 shown in FIG. 3 and the second light-splitting unit 22 shown in FIG. 4 are next to each other, the tilt direction of the groove surface a1 of the grating strip a in the first light-splitting unit 21 is different from that of the groove surface a1 of the grating strip a in the second light-splitting unit 22.

As an example, to make light output from each light-splitting unit of the light-splitting structure 2 to be white light, each of the light-splitting units comprises at least three grating strips a. Blazed angles γ of the three grating strips a is obtained based on that the inclination angle α between the vertical line from the external target position Q to the groove surface of the grating strip a and the vertical line from the target position Q external to the backlight module to the backlight module 100 is equal to the blazed angle γ of the grating strip a. Based on light of different bands needed for forming the white light, needed wavelengths λ of light output from the groove surfaces a1 of the three grating strips a is obtained. Based on $$d = \frac{\lambda}{2\sin\gamma}$$

as well as the respective blazed angles γ and the wavelengths λ of the output light, respective widths d of the three grating strips a are determined. By configuring the three grating strips a according to their respective blazed angles γ and widths d, the wavelengths λ of light output from the groove surfaces a1 of the three grating strips are what is needed for forming white light, and the wavelengths λ of the three light are different from each other.

For example, in case that light of three colors are needed to form white light, that is, light of three wavelengths is needed, then each light output unit comprises three grating strip a therein. As positions of respective grating strips a within the same light output unit are tightly next to each other, relative positions between the respective grating strips a and the target position Q are almost the same. For the purpose of reducing computation amount needed during the design of the grating strips a and reducing difficulty in fabricating the light splitting structure 2, the respective grating strips within the same light output unit may be considered to have the same blazed angle γ. Of course, the blazed angle γ of each grating strip a may be specifically designed and computed, such that accuracy of output direction can be increased, thereby increasing the 3D display effect.

As an example, according to the above technical solution, red light, green light and blue light are used to form white light. Accordingly, each light output unit comprises a red grating strip, a green grating strip and a blue grating strip. Assuming the wavelength of the red light is λ and the blazed angle of the red grating strip is $γ_1$, then the width of the red grating strip $$d_1 = \frac{\lambda_1}{2\sin\gamma_1}.$$

Assuming the wavelength of the green light is $λ_2$ and the blazed angle of the green grating strip is $γ_2$, then the width of the green grating strip $$d_2 = \frac{\lambda_2}{2\sin\gamma_2}.$$

Assuming the wavelength of the blue light is $λ_3$ and the blazed angle of the blue grating strip is $γ_3$, then the width of the blue grating strip $$d_3 = \frac{\lambda_3}{2\sin\gamma_3}.$$

The red grating strip is configured according to $λ_1$ and $γ_1$; the green grating strip is configured according to $λ_2$ and $γ_2$; and the blue grating strip is configured according to $λ_3$ and $γ_3$. As a result, light output from the groove surface of the red grating strip is red, light output from the groove surface of the green grating strip is green, and light output from the groove surface of the blue grating strip is blue, and white light is formed by combining the red, green and blue light.

It is noted that the wavelength $λ_1$ of the red light may be selected within the red light waveband, the wavelength $λ_2$ of the green light may be selected within the green light waveband, and the wavelength $λ_3$ of the blue light may be selected within the blue light waveband. The blazed angles $γ_1$, $γ_2$, and $γ_3$ may be the same, such that the computation needed during design and the fabrication difficulty of the light-splitting structure 2 are reduced. The blazed angles $γ_1$, $γ_2$, and $γ_3$ may also be designed and computed according to relative positions between the red grating strip, the green grating strip as well as the blue grating strip and their respective external target positions, such that the accuracy of light output direction may be increased, thereby increasing the 3D display effect. For example, in addition to the red grating strip, the green grating strip and the blue grating strip, each light-splitting unit further comprises grating strips of other light or output light of other wavelengths.

As an example, the number of grating strips a included in each light-splitting unit includes but not limited to three. For example, each light-splitting unit comprises four grating strip a, and four colors will be combined to form white light.

Figure 6:
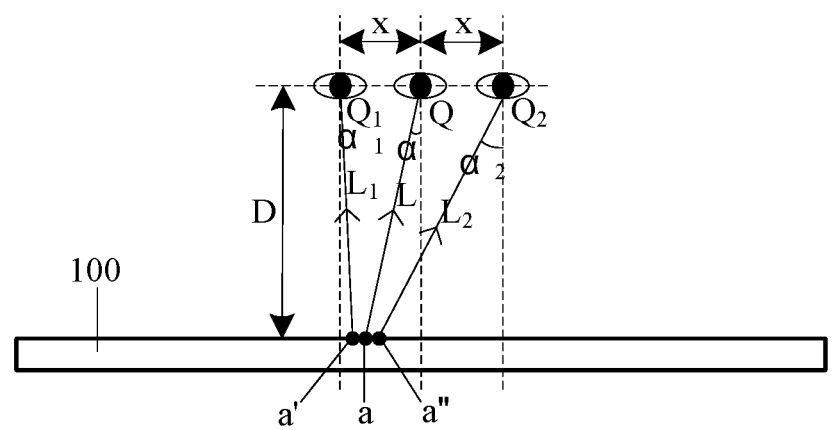
FIG. 6 illustrates a second exemplary position relationship between a target position and a grating strip.

As an example, when the backlight module 100 provided by the embodiment of the disclosure is used to provide light needed for 3D display, to increase a viewing range of the display device, the blazed angles γ of the grating strips a in the backlight module 100 may be specifically designed as needed. As illustrated in FIG. 6, to make the viewing range of the display device to be ±x, for both eyes of the viewer, when a viewing distance between the viewer and the display device (i.e., a vertical distance from both eyes of the viewer to the display device) is D and the viewer directly faces the center of the display device, the position of the viewer may change within a range between a distance offset by x leftward and a distance offset by x rightward from the current position. Within the viewing range of ±x, the left eye of the viewer can always receive light of images for the left eye, and the right eye of the viewer can always receive light of images for the right eye. To achieve the above, the range of light output from each light-splitting unit of the backlight module 100 has to be the viewing range of ±x.

As an example, it is assumed that the target position Q (i.e., the left or right eye of the viewer) external to the backlight module 100 may change between a first threshold position Q1 and a second threshold position Q2, a distance between Q1 and Q is x, and a distance between Q2 and Q is also x, a vertical distance (that is, the viewing distance) from the external target position Q to the backlight module is D. When the output light exits from a direction perpendicular to the groove surface of the grating strip and finally reaches the first threshold position Q1, assuming that the grating strip making the output light to go along the direction is a first grating strip a', a blazed angle $\gamma_1$ of the first grating strip a' is equal to an inclination angle $$\alpha_1 = \text{arc}\left(\cos\frac{D}{L_1}\right)$$

between a vertical line from the first threshold position Q1 to the groove surface of the first grating strip a' and a vertical line from the first threshold position Q1 to the backlight module 100, where $L_1$ is a vertical distance from the first threshold position to the first grating strip a'. When the output light exits from a direction perpendicular to the groove surface of the grating strip and finally reaches the second threshold position Q2, assuming that the grating strip making the output light to go along the direction is a second grating strip a", a blazed angle $\gamma_2$ of the second grating strip a" is equal to an inclination angle $$\alpha_2 = \text{arc}\left(\cos\frac{D}{L_2}\right)$$

between a vertical line from the second threshold position Q2 to the groove surface of the second grating strip a" and a vertical line from the second threshold position Q2 to the backlight module 100, where $L_2$ is a vertical distance from the second threshold position Q2 to the second grating strip a".

As an example, in each light-splitting unit of the backlight module 100, if there are the first grating strip a' and the second grating strip a", the blazed angle of the first grating strip a' is $$\gamma_1 = \text{arc}\left(\cos\frac{D}{L_1}\right)$$

the blazed angle of the second grating strip a" is $$\gamma_2 = \text{arc}\left(\cos\frac{D}{L_2}\right),$$

and blazing angles of the remaining grating strips a other than the first grating strip a' and the second grating strip a" satisfy $$\text{arc}\left(\cos\frac{D}{L_1}\right) \leq \gamma < \text{arc}\left(\cos\frac{D}{L_2}\right),$$

then the range of output light from each light-splitting unit may be the viewing range ±x. As a result, the target position (the left or right eye of the viewer) can always receive light from the corresponding light-splitting unit when it changes between the first threshold position Q1 and the second threshold position Q2, allowing the display device to have the viewing range ±x during 3D display.

It is noted that, to prevent cross-talking between the images for the left and right eyes of the viewer when the viewer views the 3D display images, x of the viewing range ±x should have a value of no more than an interocular distance of human eyes. That is, the distance between the first threshold position Q1 and the second threshold position Q2 is less than or equal to twice the interocular distance of human eyes (for example, less than or equal to 100 mm), such that light from a light-splitting unit of the backlight module 100 may only be received by one but not by the other eye of the viewer. For example, it is ensured that light from the first light-splitting unit 21 only enters the left eye but not the right eye of the viewer, and light from the second light-splitting unit 22 only enters the right eye but not the left eye of the viewer.

As an example, in the backlight module 100 as provided by the embodiment of the disclosure, according to the above description, among the four side surface of the LGP 1, the side having the edge light source 3 is referred to as the first side surface, and the side opposite to the first side surface is referred to as the second side surface. To increase the light usage, a reflective film 31 may be disposed on the second side surface of the LGP 1. As illustrated in FIG. 1, the reflective film 31 reflects light incident on the second side surface back to the LGP 1. As an example, the reflective film is disposed on other side surfaces other than the first and second side surfaces, such that light incident on the other side surfaces are reflected back to the LGP 1.

As an example, in the embodiment, the light-splitting structure 2 and the LGP 1 may be an integral structure (for example, the light-splitting structure 2 may be integrally formed with the LGP 1), such that assembly process of the backlight module 100 may be simplified. To realize the integral structure, injection molding may be used to integrally form the light-splitting structure 2 and the LGP 1 at the same time. It may also form the LGP 1 first, and then grooves are carved on its light output surface to form the light-splitting structure 2. The light-splitting structure 2 may also be a film or substrate separately superimposed on the light output surface of the LGP 1, such that the formation process of the LGP 1 may be simplified.

As an example, the edge light source 3 of the backlight module of the embodiment is a white light source, thus light provided by the backlight module 100 is white light. If the backlight module 100 further comprises the underlying light source 4, the underlying light source 4 may also be a white light source.

As an example, the edge light source 3 of the backlight module of the embodiment is a natural light source, thus light provided by the backlight module 100 is natural light. The edge light source 3 may also be a linear polarized light source, thus light provided by the backlight source 100 may be linearly polarized light. If the backlight module 100 further comprises the underlying light source 4, the underlying light source 4 may also be a natural light source or linear polarized light source. For example, both the edge light source 3 and underlying light source are natural light sources or linear polarized light sources.

Embodiment 2

Figure 7:
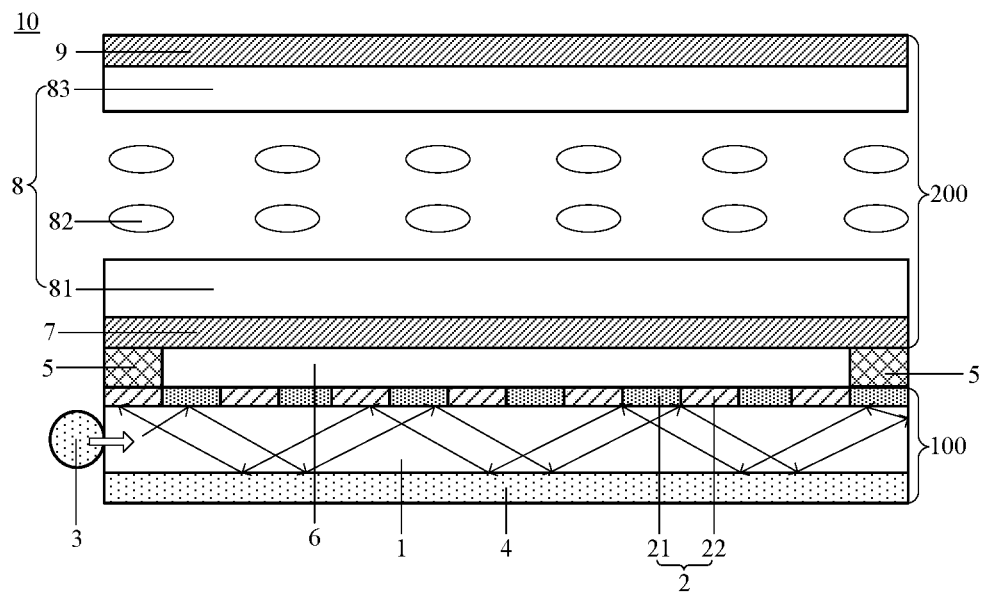
FIG. 7 is a side view of a backlight module in accordance with another embodiment of the disclosure.
Figure 8:
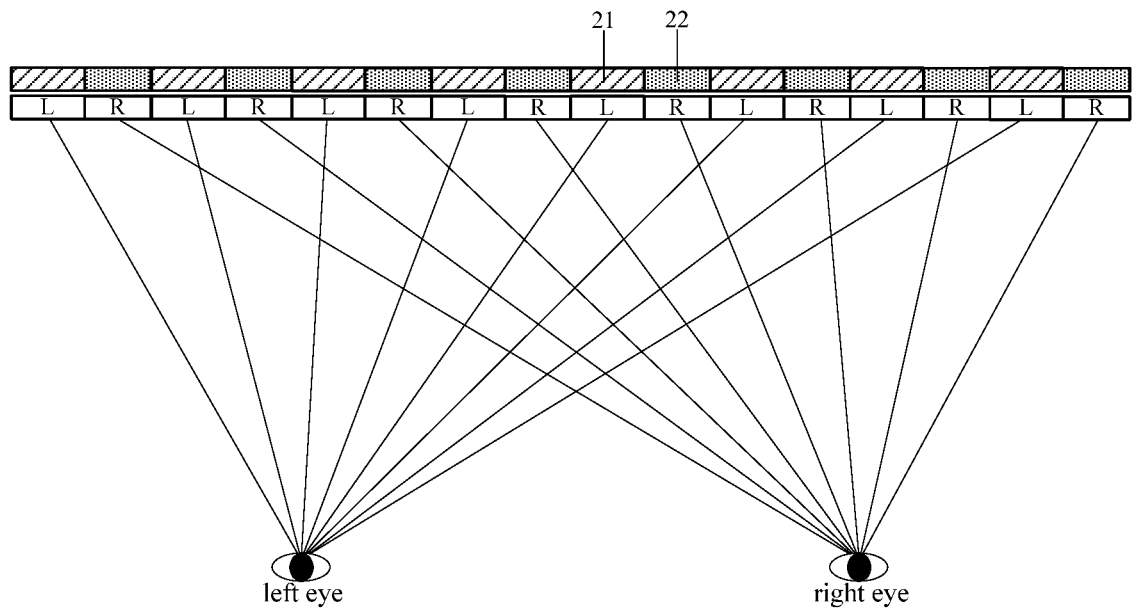
FIG. 8 is a first exemplary optical path of a display device rendering 3D display in accordance with another embodiment of the disclosure.

Base on embodiment 1, the embodiment further provides a display device. As illustrated in FIGS. 7 and 8, the display device 10 comprises a display panel 200 and a backlight module 100, which are superimposed together (for example stacked together). The display device 200 further comprises a plurality of pixels arranged as an array, so that the display panel 200 includes multiple columns of pixels. The backlight module 100 is for example the backlight module provided by Embodiment 1. The backlight module 100 comprises a plurality of light-splitting units which are strip-shaped and have an extension direction the same as a column direction of the pixels in the display panel. Width of each of the light-splitting units of the backlight module 100 is equal to that of each of pixels of the display panel, and the light-splitting units are in one-to-one correspondence with pixel columns.

As an example, the plurality of light-splitting units of the backlight module 100 comprises first light-splitting units 21 and second light-splitting units 22. The first light-splitting units 21 and the second light-splitting units 22 are arranged alternatively. The respective columns of pixels correspond to the first light-splitting units 21 are first pixels L, and respective columns of pixels correspond to the second light-splitting units 22 are second pixels R. After passing through the light-splitting units 21, light will have a transmission direction towards the left eye of a viewer. Such light passes through the first pixels L and carries image information of the first pixels L, the light will be received by the left eye of the viewer. At the same time, after passing through the second light-splitting units 22, light will have a transmission direction towards the right eye of the viewer. Such light passes through the second pixels R and carries image information of the second pixels R, the light will be received by the right eye of the viewer. It thus achieves separation of the first pixel light from the second pixel light. By supplying the left eye image signal to the first pixels L and the right eye image signals to the second pixels R, it thus realizes 3D display.

As an example, in the display device provided by the embodiment, the backlight module 100 can provide suitable light for 3D display by the display device, such that the display device can realize 3D display function. In comparison with a parallax barrier 3D display device, it does not need to configure a parallax barrier. As a result, it on one hand overcomes the problem of low light usage caused by the parallax barrier and increases the brightness of 3D images. On the other hand, it reduces the cost of 3D display devices, reducing the thickness of the 3D display devices as well as volume and weight of the 3D display devices.

As an example, in comparison with a directional backlight 3D display device, the display device as provided by the embodiment does not need time division complexing of the light source, the involved technology is simple and easy to implement.

As an example, when the display device provided by the embodiment is used for 2D display, the method for driving the display panel 200 is changed, and 2D display may be realized by applying 2D image signals to the pixels of the display panel 200. In comparison with a lenticular lens array 3D display device, the display device provided by the embodiment of the disclosure can switch between 3D and 2D display functions without the need for optical lens, thereby avoiding the optical aberration caused for 2D display images, and increasing the image display effect of the 2D display by the 3D/2D display device.

As an example, to increase the brightness of the 2D image displayed by the display device of the embodiment, other light sources are used instead of the edge light source 3 to provide light for the 2D display. For example, an underlying light source 4 is disposed on a surface opposite to the light output surface of the LGP 1 of the backlight module 100. The underlying light source 4 is a surface light source. When 2D display is needed, the edge light source 3 is switched off and the underlying light source 4 is switched on. Most of light emitted by the underlying light source 4 will enter the LGP 1 vertically; therefore lots of light will exit from the grating strips of the light-splitting structure 2, thereby increasing image brightness when the display device is used for 2D display.

As an example, the edge light source 3 and underlying light source 4 are switched on at the same time, which further increase the image brightness when the display device is used for 2D display.

Figure 9:
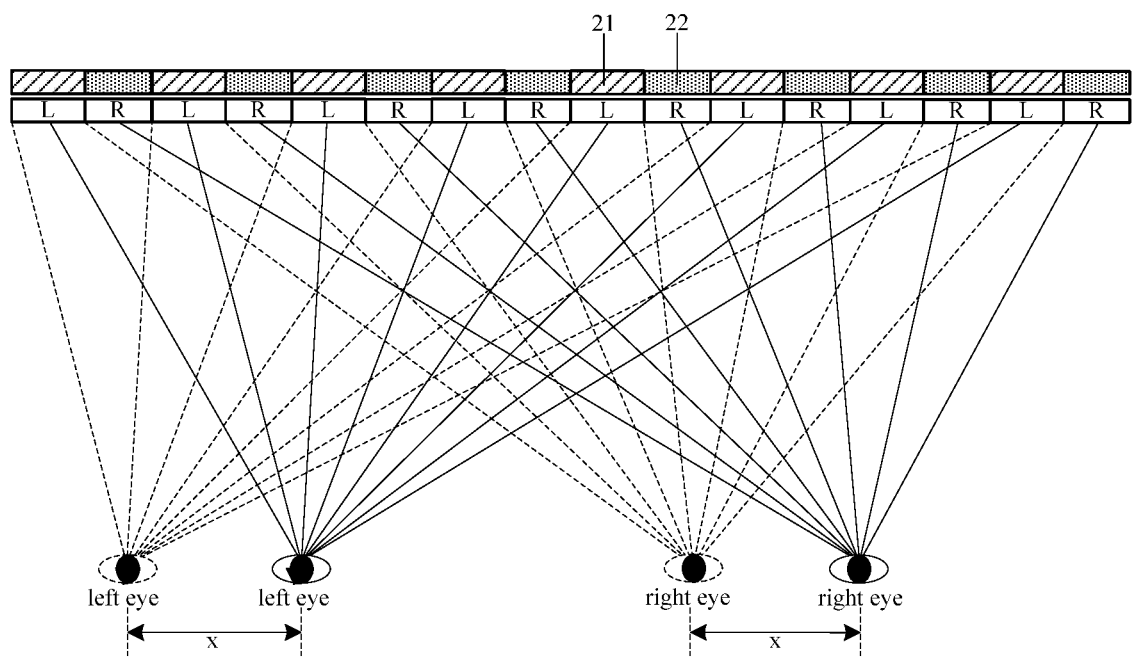
FIG. 9 is a second exemplary optical path of a display device rendering 3D display in accordance with another embodiment of the disclosure.

In an example illustrated in FIG. 9, to increase the viewing range when the display device is used for 3D display, each light-splitting unit of the light-splitting structure 2 in the backlight module 100 includes a first grating strip and a second grating strip. The blazed angle of the first grating strip is $$\arc\!\left(\cos\frac{D}{L_1}\right),$$

the blazed angle of the second grating strip is $$\arc\!\left(\cos\frac{D}{L_2}\right),$$

and blazing angles of the remaining grating strips are in the range from $$\arc\!\left(\cos\frac{D}{L_1}\right)$$

to $$\arc\!\left(\cos\frac{D}{L_2}\right),$$

allowing light output from each light-splitting to be in the viewing range of ±x (for meaning of ±x please refer to the description of Embodiment 1). As a result, the position of the left or right eye of the viewer can always receive light from the corresponding light-splitting unit, that is, when the position of the viewer changes within the viewing range ±x, a 3D image can always be seen. As a result, the display device has the viewing range ±x when used for 3D display. To prevent cross-talking between the images for the left and right eyes, the value of x should be less than or equal to an interocular distance of human eyes.

As an example, still referring to FIG. 7, the display panel and the backlight module are bonded by adhesive 5. The adhesive may be an adhesive film which overlays the whole region or only part of region between the display panel 200 and the backlight module 100. The adhesive 5 is for example in the form of a frame, and the adhesive 5 corresponds to a peripheral region of the display panel 200. Thus, a cavity 6 is formed between the display panel and backlight module 100. On one hand, such a configuration makes the pixel region of the display panel correspond to the cavity, which can prevent the problem of scattering and refraction of light caused by water and air bubble in the adhesive film which overlays the whole region, thereby increasing display quality. On the other hand, such a configuration can avoid the problem of shielding the pixel region of the display panel 200, increasing light transmissivity. It may also save material cost. To further reduce scattering and refraction of light, the adhesive 5 is configured for example as a close frame, and the cavity 6 is vacuumed, making an interior of the cavity to be in a vacuum state, thereby preventing air or dust particles in the cavity from scattering or refracting light.

As an example, still referring to FIG. 7, in the embodiment of the display device 10, the display panel 200 comprises a liquid crystal cell 8. The liquid crystal cell 8 comprises a first substrate 81 and a second substrate 83 disposed as opposed to each other as well as a liquid crystal layer 82 sandwiched between the first substrate 81 and the second substrate 83. A lower polarizer 7 is disposed on an outer side of the first substrate 81 (the side far away from the liquid crystal cell 82) of the liquid crystal cell 8, an upper polarizer 9 is disposed on an outer side of the second substrate 83 (the side far away from the liquid crystal cell 82) of the liquid crystal cell 8. An optical axis of the lower polarizer 7 is perpendicular to that of the upper polarizer 9, such that a polarization direction of light passing through the lower polarizer 7 is perpendicular to that of light passing through the upper polarizer 9. The edge light source 3 of the backlight module is a natural light source. If the backlight module further comprises an underlying light source 4, then the underlying light source 4 is also a natural light source.

As an example, for the display device with the above configuration, if the edge light source 3 of the backlight module 100 is a linear polarized light source, the lower polarizer 7 in the display panel 200 may be omitted while the upper polarizer 9 is kept, and the polarization direction of light emitted by the edge light source 3 is perpendicular to that of light passing through the upper polarizer 9. As the lower polarizer 7 is omitted, an overall thickness of the display device is reduced.

As an example, in the embodiment, the edge light source 3 of the backlight module 100 is white light source, such that the backlight module 100 provides white light to the display panel 200. If the backlight module 100 further comprises an underlying light source 4, then the underlying light source 4 is also a white light source.

It is noted that the display device as provided by the embodiment may be a liquid crystal panel, an E-paper, a mobile phone, a tablet PC, a television, a monitor screen, a notebook PC, a digital photoframe, a navigator and any product or component having a display function.

Embodiment 3

Based on Embodiment 2, the embodiment provides a method for driving a display device. With reference to FIGS. 7 and 8, the method is used for driving the display device of Embodiment 2. For pixels of the display device, pixels corresponding to the first light-splitting units 21 of the display device are first pixels L, and pixels corresponding to the second light-splitting units 22 of the display device are second pixels R.

As an example, the driving method provided by the embodiment of the disclosure comprises a step of driving the display device to render 3D display, and step comprises: transmitting image signals for the left eye to the first pixels L, and at the same time, transmitting image signals for the right eye to the second pixels R. It is noted that, the edge light source 3 of the display device may be switched on before driving, such that proper light is provided for the display panel to render 3D display.

As an example, during the procedure, light emitted by the edge light source 3 propagates within the LGP 1 through reflection. When the light arrives at the light-splitting structure 2 of the backlight module 100, under the action of which, light hitting the first light-splitting units 21 will output towards the left eye of the viewer, while light hitting the second light-splitting units 22 will output towards the right eye of the viewer, thereby realizing separation of light.

As an example, after light is separated, the output light towards the left eye of the viewer will pass through the first pixels L and gets left eye image signals applied thereto, thus this part of light carries the left eye image signals and will be eventually received by the left eye of the viewer. The left eye of the viewer thus sees the left eye image. The output light towards the right eye of the viewer will pass through the second pixels R and gets right eye image signals applied thereto, thus this part of light carries the right eye image signals and will be eventually received by the right eye of the viewer. The right eye of the viewer thus sees the right eye image. The left eye image and right eye image seen by the viewer are synthesized by the human brain, thus achieving a 3D display effect.

As an example, the driving method provided by the embodiment of the disclosure further comprises a step of driving the display device to render 2D display. The display device comprises a plurality of pixel element groups arranged as an array, each pixel element group comprises one of first pixels and one of second pixels. The method for driving the display device to render 2D display comprises transmitting 2D image signals to pixels in each of the pixel element groups. For example, image signals transmitted to the first pixel and the second pixel in a same pixel element group are the same. For example, the 2D image signals transmitted to pixels in different pixel element groups may be the same or different. It is noted that, the edge light source 3 of the display device is switched on before driving, so as to provide light for the display device to render 2D display. If the backlight module of the display device comprises the edge light source 3 and the underlying light source 4, then the underlying light source 4 is switched on and the edge light source 3 is switched off before driving, to improve brightness of 2D images displayed by the display device. As an example, the edge light source 3 and the underlying light source 4 are switched on at the same time, further increasing the brightness of 2D images displayed by the display device.

As an example, when the backlight module of the display device comprises the edge light source 3 and the underlying light source, the step of driving the display device to render 2D display comprises: switching on the underlying light source 4, switching off the edge light source 3, and transmitting 2D image signals to all pixels of the display device, where images signals transmitted to the first pixel and the second pixel in the same pixel element group may be different or the same. It is noted that, as the underlying light source 4 is used to provide light for the display panel of the display device, a large amount of light will incident on the light-splitting structure 2 of the backlight module, making light splitting effect of the light-splitting structure 2 less obvious. As a result, lots of light enters the display panel 200 in a direction vertical or substantially vertical to the display panel. By this means, a regular method for driving the 2D display, that is the above "transmitting 2D image signals to all pixels of the display device", may be used to achieve 2D display by the display panel 200.

What is described above is related to the illustrative embodiments of the disclosure only and not limitative to the scope of the disclosure; the scopes of the disclosure are defined by the accompanying claims.

What is claimed is:

1. A backlight module, comprising:
a light guide plate;
an edge light source, disposed on a side surface of the light guide plate; and
a light-splitting structure, disposed on a light output surface of the light guide plate and comprising:
a plurality of strip-shaped first light-splitting units, configured for directing light to output towards a first position external to the backlight module; and
a plurality of strip-shaped second light-splitting units, configured for directing light to emit towards a second position external to the backlight module,
wherein the first light-splitting units and second light-splitting units are alternately disposed on the light output surface of the light guide plate, each of first light-splitting unit and second light-splitting unit comprising at least one grating strip, wherein the at least one grating strip is a blazed grating, the at least one grating strip comprises a grating surface and a groove surface, the grating surface is parallel to the light output surface of the light guide plate, the groove surface is tilted relative to the grating surface, and an inclination angle between the grating surface and the groove surface is a blazed angle γ, and
wherein the at least one grating strip comprises at least a first grating strip and a second grating strip, a blazed angle of the first grating strip is $$\gamma_1 = \mathrm{arc}\left(\cos\frac{D}{L_1}\right),$$

a blazed angle of the second grating strip is $$\gamma_2 = \mathrm{arc}\left(\cos\frac{D}{L_2}\right),$$

blazing angles γ of remaining grating strips of each of the light-splitting units are within a range from $$\mathrm{arc}\left(\cos\frac{D}{L_1}\right) \le \gamma \le \mathrm{arc}\left(\cos\frac{D}{L_2}\right),$$

where D is a vertical distance from the external target position to the back light module, $L_1$ is a vertical distance from a first threshold position to the groove surface of the first grating strip, $L_2$ is a vertical distance from a second threshold position to the groove surface of the second grating strip, a distance between the first threshold position and the second threshold position is less than or equal to 100 mm.

2. The backlight module of claim 1, further comprising an underlying light source disposed on a side opposite to the light output surface of the light guide plate.

3. The backlight module of claim 1, wherein each of the first light-splitting unit and second light-splitting unit comprises at least three grating strips, and lights output from groove surfaces of the three granting strips are of different wavelengths and combined to form white light.

4. The backlight module of claim 3, wherein each of the first light-splitting unit and second light-splitting unit comprises at least a red grating strip, a green grating strip and a blue grating strip, light output from the groove surface of the red grating strip is red light, light output from the groove surface of the green grating strip is green light, and light output from the groove surface of the blue grating strip is blue light.

5. The backlight module of claim 1, wherein a side surface of the light guide plate having the edge light source disposed thereon is a first side surface, an extension direction of both the strip-shaped first light-splitting units and the strip-shaped second light-splitting units is parallel to a long side of the first side surface.

6. The backlight module of claim 1, wherein a side surface of the light guide plate having the edge light source disposed thereon is a first side surface, a side surface opposite to the first side surface of the light guide plate is a second side surface, and a reflective film is disposed on the second side surface.

7. The backlight module of claim 1, wherein the light-splitting structure and the light guide plate are an integral structure, or the light-splitting structure is a film or substrate superimposed on the light output surface of the light guide plate.

8. The backlight module of claim 1, wherein the edge light source is a white light source, in condition that the backlight module further comprises an underlying light source, the underlying light source is a white light source.

9. The backlight module of claim 1, wherein the edge light source is a natural light source or a linear polarized light source, in condition that the backlight module further comprises an underlying light source, the underlying light source is a natural light source or a linear polarized light source.

10. A display device comprising:
the backlight module of claim 1; and
a display panel, superimposed on the backlight module and comprising a plurality of pixels arranged as an array, a width of each of the first light-splitting unit and the second light-splitting unit of the backlight module being equal to that of the pixels of the display panel, and the first light-splitting unit and the second light-splitting unit being in one-to-one correspondence with pixel columns.

11. The display device of claim 10, wherein the backlight module and the display panel are bonded by adhesive.

12. The display device of claim 11, wherein the adhesive is in the form of a frame, and the adhesive is disposed in a peripheral region of the display panel.

13. The display device of claim 12, wherein the backlight module, the display panel and the adhesive forms a cavity and the cavity is a vacuum cavity.

14. The display device of claim 10, wherein the edge light source of the backlight module is a natural light source, the display panel further comprises a liquid crystal cell, an upper polarizer and a lower polarizer, the upper polarizer is disposed on a side of the liquid crystal cell which is further away from the backlight module, the lower polarizer is disposed on a side of the liquid crystal cell which is close to the backlight module, an optical axis of the upper polarizer is perpendicular to that of the lower polarizer; or the edge light source of the backlight module is a linear-polarized light source, the display panel further comprises a liquid crystal cell and an upper polarizer, the upper polarizer is disposed on a side of the liquid crystal cell which is further away from the backlight module, a polarization direction of light emitted by the linear-polarized light source is perpendicular to that of light passing through the upper polarizer.

15. A method for driving a display device, the display device comprising:
   a backlight module, comprising:
      a light guide plate;
      an edge light source, disposed on a side surface of the light guide plate; and
      a light-splitting structure, disposed on a light output surface of the light guide plate and comprising:
      a plurality of strip-shaped first light-splitting units, configured for directing light to output towards a first position external to the backlight module; and
      a plurality of strip-shaped second light-splitting units, configured for directing light to emit towards a second position external to the backlight module,
      wherein the first light-splitting units and second light-splitting units are alternately disposed on the light output surface of the light guide plate, each of first light-splitting unit and second light-splitting unit comprising at least one grating strip,
      wherein the at least one grating strip is a blazed grating, the at least one grating strip comprises a grating surface and a groove surface, the grating surface is parallel to the light output surface of the light guide plate, the groove surface is tilted relative to the grating surface, and an inclination angle between the grating surface and the groove surface is a blazed angle $\gamma$,
      wherein the at least one grating strip comprises at least a first grating strip and a second grating strip, a blazed angle of the first grating strip $$\gamma_1 = \mathrm{arc}\left(\cos\frac{D}{L_1}\right),$$

a blazed angle of the second grating strip is $$\gamma_2 = \mathrm{arc}\left(\cos\frac{D}{L_2}\right),$$

blazing angles $\gamma$ of remaining grating strips of each of the light-splitting units are within a range from $$\mathrm{arc}\left(\cos\frac{D}{L_1}\right) \leq \gamma \leq \mathrm{arc}\left(\cos\frac{D}{L_2}\right),$$

where D is a vertical distance from the external target position to the back light module, $L_1$ is a vertical distance from a first threshold position to the groove surface of the first grating strip, $L_2$ is a vertical distance from a second threshold position to the groove surface of the second grating strip, a distance between the first threshold position and the second threshold position is less than or equal to 100 mm; and a display panel, superimposed on the backlight module and comprising a plurality of pixels arranged as an array, a width of each of the first light-splitting unit and the second light-splitting unit of the backlight module being equal to that of the pixels of the display panel, and the first light-splitting unit and the second light-splitting unit being in one-to-one correspondence with pixel columns, among pixels of the display device, pixels corresponding to the first light-splitting units of the display device are first pixels, and pixels corresponding to the second light-splitting units of the display device are second pixels;

the method comprises:
   driving the display device to render 3D display, wherein image signals for the left eye are transmitted to the first pixels, and image signals for the right eye are transmitted to the second pixels at the same time.

16. The method of claim 15, wherein the display device comprises a plurality of pixel element groups arranged as an array, each pixel element group comprises one of the first pixels and one of the second pixels, the method further comprises:
   driving the display device to render 2D display, wherein 2D image signals are transmitted to pixels in each of the pixel element groups.

17. The method of claim 16, wherein 2D image signals transmitted to the first pixel and the second pixel in a same pixel element group are the same.

18. The method of claim 16, wherein the display device comprises an edge light source and an underlying light source, the method further comprises:
   driving the display device to render 2D display, wherein the underlying light source is switched on and the edge light source is switched off, and 2D image signals transmitted to all pixels of the display device.

19. A backlight module, comprising:
   a light guide plate;
   an edge light source, disposed on a side surface of the light guide plate; and
   a light-splitting structure, disposed on a light output surface of the light guide plate and comprising:
   a plurality of strip-shaped first light-splitting units, configured for directing light to output towards a first position external to the backlight module, and
   a plurality of strip-shaped second light-splitting units, configured for directing light to emit towards a second position external to the backlight module,
   wherein the first light-splitting units and second light-splitting units are alternately disposed on the light output surface of the light guide plate, each of first light-splitting unit and second light-splitting unit comprising at least one grating strip,
   wherein the at least one grating strip is a blazed grating, the at least one grating strip comprises a grating surface and a groove surface, the grating surface is parallel to the light output surface of the light guide plate, the groove surface is tilted relative to the grating surface, and an inclination angle between the grating surface and the groove surface is a blazed angle $\gamma$, wherein the blazed angle γ of the at least one grating strip is equal to an angle between a vertical line from an external target position to the groove surface of the at least one grating strip having the blazed angle γ and a vertical line from the external target position to the light output surface of the light guide plate,
wherein a width of the at least one grating strip is $$d = \frac{\lambda}{2\sin\gamma},$$

where λ is a wavelength of light output from the groove surface of the at least one grating strip, and
wherein each of the first light-splitting unit and second light-splitting unit comprises at least a first grating strip and a second grating strip, a blazed angle of the first grating strip is $\gamma_1 =$ $$\mathrm{arc}\!\left(\cos\frac{D}{L_1}\right),$$

a blazed angle of the second grating strip is $$\gamma_2 = \mathrm{arc}\!\left(\cos\frac{D}{L_2}\right),$$

blazing angles γ of remaining grating strips of each of the light-splitting units are within a range from $$\mathrm{arc}\!\left(\cos\frac{D}{L_1}\right) \leq \gamma \leq \mathrm{arc}\!\left(\cos\frac{D}{L_2}\right),$$

where D is a vertical distance from the external target position to the back light module, $L_1$ is a vertical distance from a first threshold position to the groove surface of the first grating strip, $L_2$ is a vertical distance from a second threshold position to the groove surface of the second grating strip, a distance between the first threshold position and the second threshold position is less than or equal to 100 mm.

\* \* \* \* \*